June 5, 1962 E. V. SUNDT 3,037,400
DIFFERENTIAL GEAR REDUCER
Filed Jan. 14, 1959 4 Sheets-Sheet 3

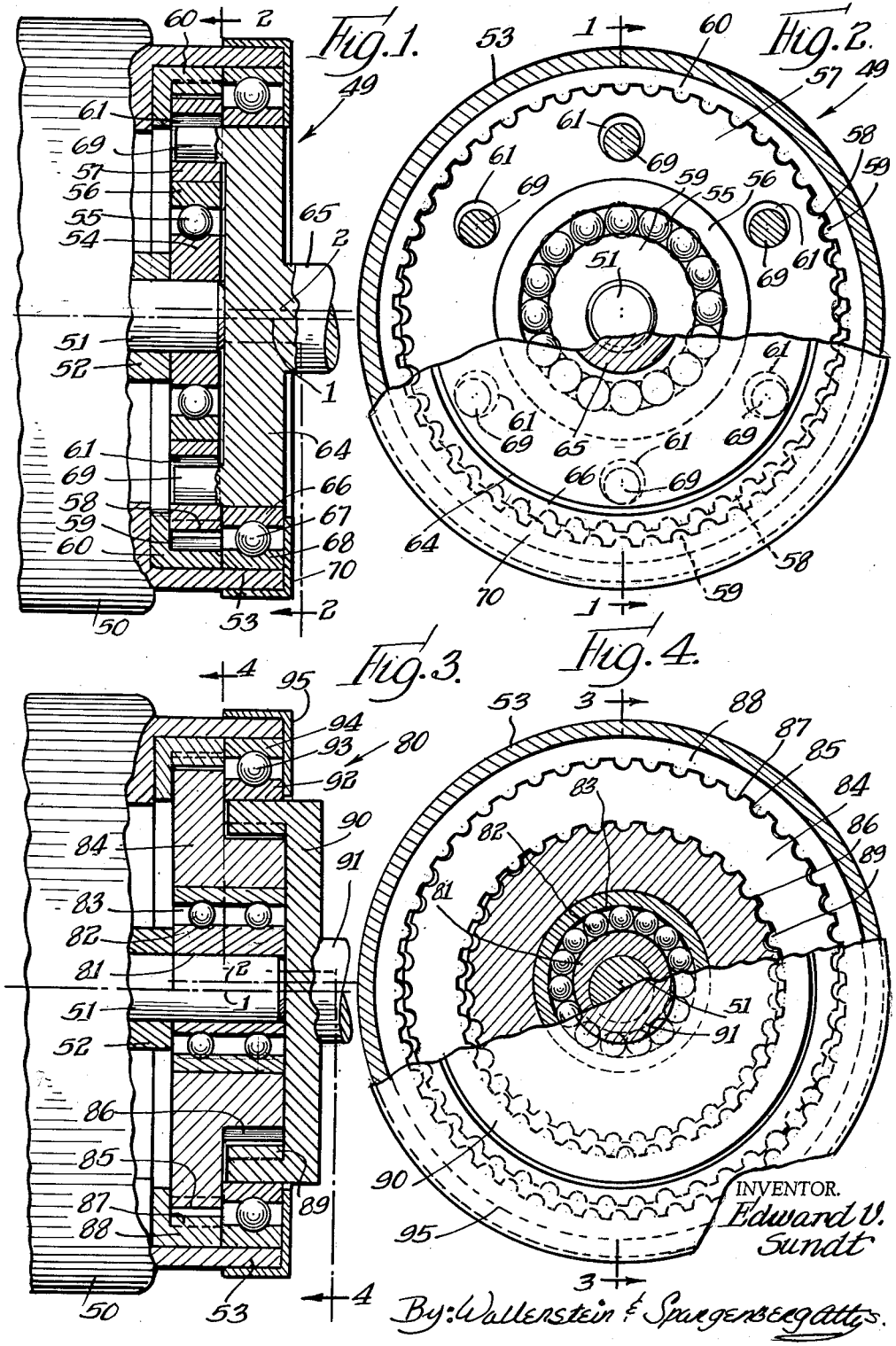

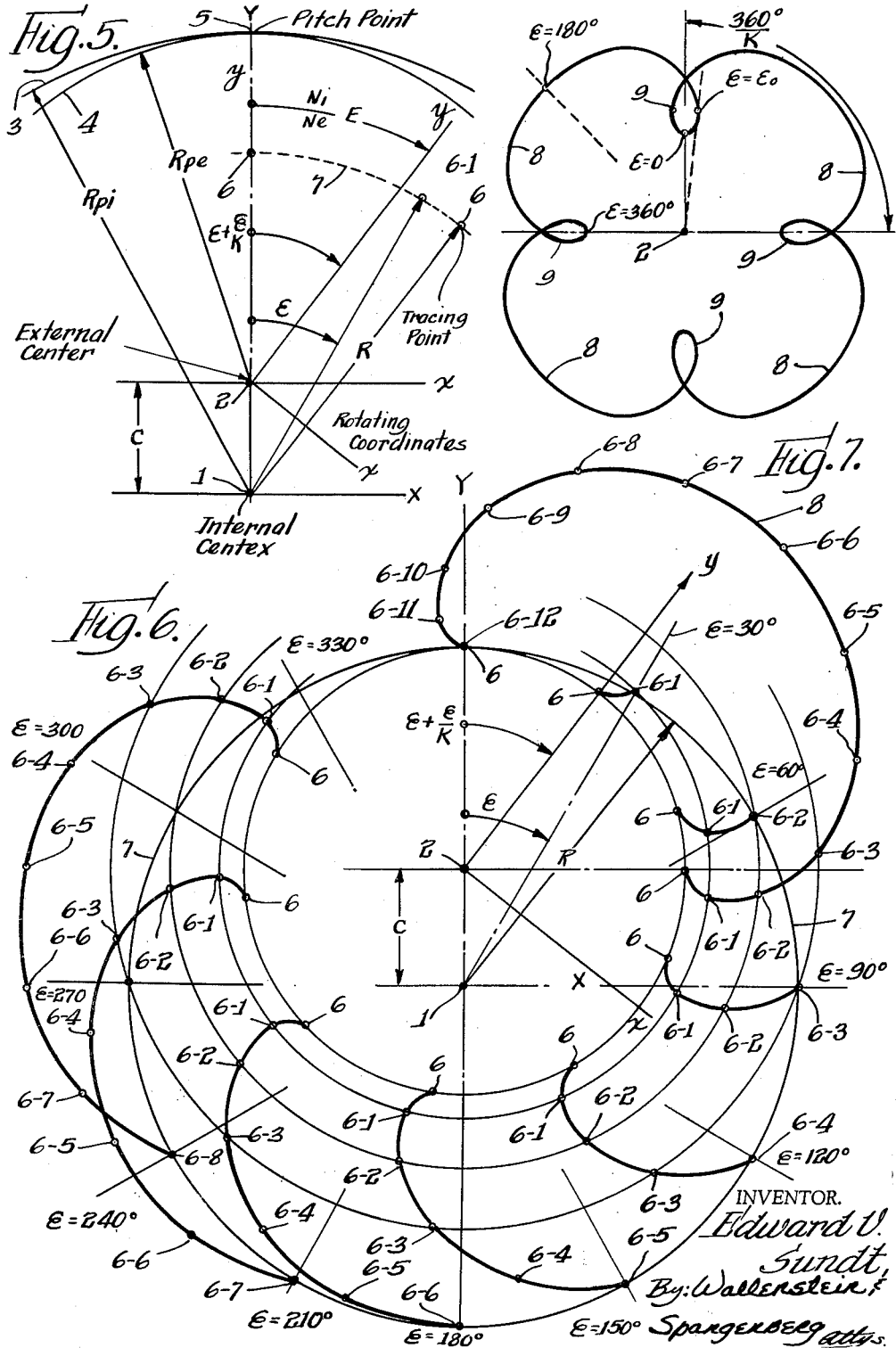

Curtate Center Path
$R > R_{pi}$  $C < \frac{R}{1+K}$

Cusped Center Path
$R = R_{pi}$  $C = \frac{R}{1+K}$

Prolate (Looped) Center Path
$R < R_{pi}$  $C > \frac{R}{1+K}$

INVENTOR.
Edward V. Sundt
BY Wallenstein &
Spangenberg attys

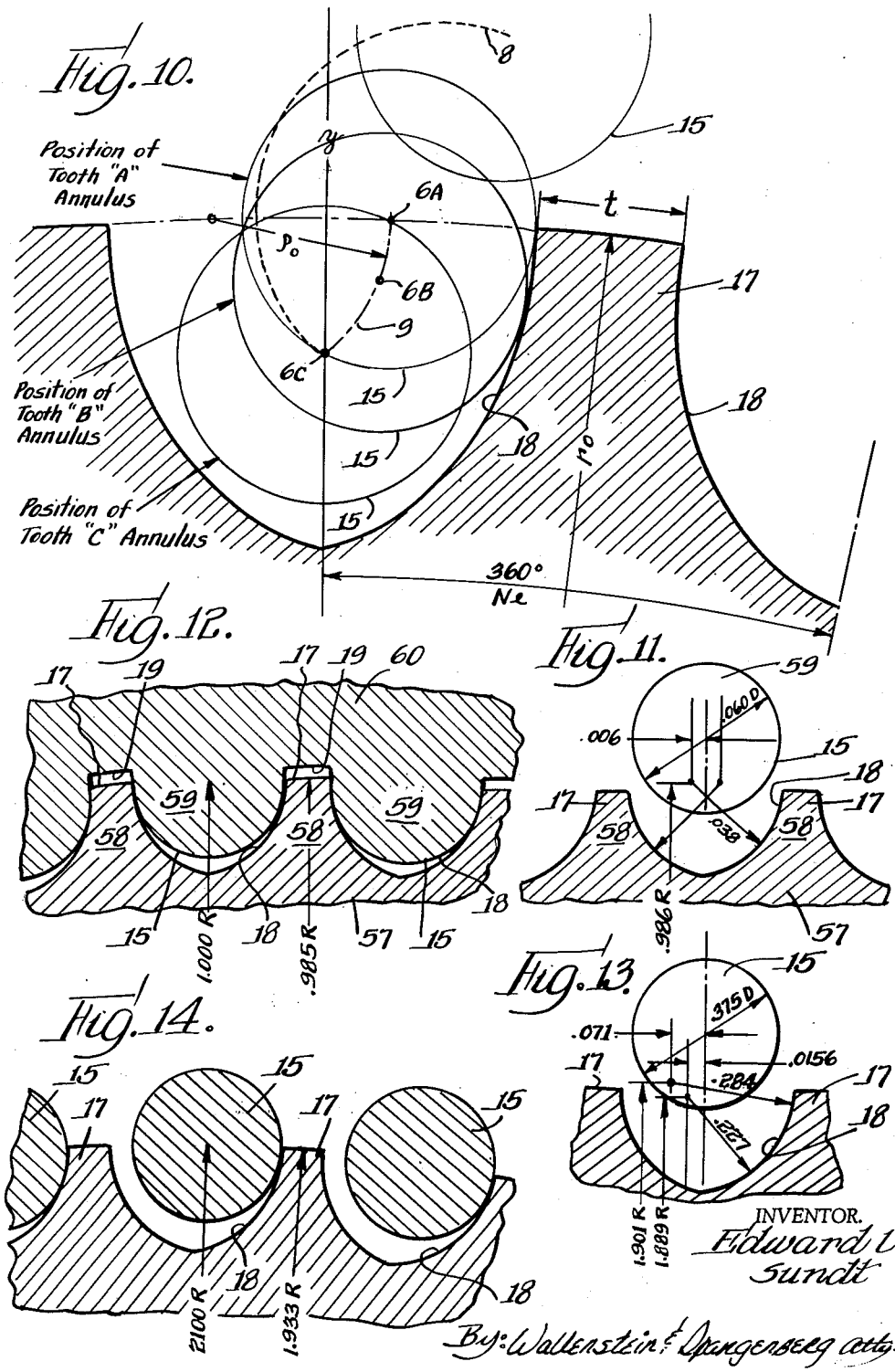

United States Patent Office 3,037,400
Patented June 5, 1962

3,037,400
DIFFERENTIAL GEAR REDUCER
Edward V. Sundt, 118 Sterling Lane, Wilmette, Ill.
Filed Jan. 14, 1959, Ser. No. 786,731
15 Claims. (Cl. 74—804)

This invention relates to improvements in differential gear reducers, and more particularly to those having eccentrically driven external toothed rotors meshing with internal toothed annuli, either stationary or rotatable or both, where the annuli have one or more greater number of teeth than the rotor for obtaining desired speed reduction ratios, and wherein, for design reasons, the eccentric motions must be held relatively small with respect to the overall dimensions of the reducer.

Up to the present time, differential gear reducers of this type have been notoriously inefficient and noisy, the efficiency ranging in the order of 10% to 20% efficiency, and the noise and vibration being quite high, and this accounts for the reason that differential gear reducers of this type have not been widely used.

The principal object of this invention is to produce an improved differential gear reducer of this type which is quiet and vibrationless in operation and which is highly efficient in operation, wherein efficiencies of over 90% are easily attained.

The chief enemy to efficient, noiseless and vibrationless operation is friction and improper conjugation of the teeth. In accordance with this invention, friction is not only avoided as much as possible at the points of bearing, but also the engaging tooth forms are such that minimum pressure angles are used to minimize tooth loads and loads reflected back into the bearings, and the teeth conjugate sufficiently during operation to provide smooth continuous continuity of angular motion with minimum noise and vibration. In this way irregular power wasting motion is avoided and, also, noise and vibration are reduced. Further, in accordance with this invention, the teeth are structurally strong, and are so formed that very close manufacturing tolerances are not required and that they may be molded by simple plastic or powder metallurgy methods.

In accordance with this invention, the teeth of the external toothed rotor are based on a looped prolate center path generated by a tracing point on the tooth centers of the annulus with respect to the rotor upon rotation of the annulus and rotor in accordance with the speed reduction ratio. Such a looped prolate center path curve, while an epitrochoid, must be distinguished from other epitrochoids, such as a curtate center path curve or a cusped center path curve, since the latter center path curves cannot form a base for the teeth and still produce the new and beneficial results as the former base forming curve can produce.

The looped prolate center path base for the teeth of this invention is particularly suitable for small eccentricities and high speed reduction ratios, permits the use of larger eccentricities for smaller overall dimensions of the gear reducer, provides for substantially zero pressure angles at the engaging teeth, provides for maximum efficiency, provides for multiple tooth conjugation, produces uniform angular motion, and minimizes noise and vibration. These beneficial results cannot be obtained by the other epitrochoid curve bases, the curtate form being suitable only for large eccentricities and low speed reduction ratios, and the cusped form being noisy and not yielding uniform angular motion.

Further objects of this invention reside in the details of construction of the differential gear reducer and in the cooperative relationships between the component parts thereof.

Other objects and advantages of this invention will become apparent to those skilled in the art upon reference to the accompanying specifications, claims and drawings in which:

FIG. 1 is a vertical sectional view through one form of the differential gear reducer of this invention, it being taken substantially along the line 1—1 of FIG. 2;

FIG. 2 is an elevational view, partly in section, of the differential gear reducer illustrated in FIG. 1, it being taken substantially along the line 2—2 of FIG. 1;

FIG. 3 is a vertical sectional view similar to FIG. 1, but illustrating another form of the differential gear reducer of this invention, it being taken substantially along the line 3—3 of FIG. 4;

FIG. 4 is an elevational view, partly in section, of the differential gear reducer illustrated in FIG. 3, it being taken substantially along the line 4—4 of FIG. 3;

FIG. 5 is a graphical representation of the parameters involved in generating a looped prolate center path curve which forms the base for the teeth of the annulus and rotor;

FIG. 6 is a graphical representation similar to FIG. 5 but illustrating the steps taken in the generation of the looped prolate center path curve;

FIG. 7 is a graphic representation illustrating the completely generated looped prolate center path curve;

FIG. 10 is an enlarged illustration illustrating the coaction between the teeth of the annulus and rotor constructed in accordance with the instant invention;

FIG. 11 is a partial view illustrating and giving the dimensions for a typical differential gear reducer having a speed reduction ratio of 75 to 1;

FIG. 12 is a partial view showing the coaction of the teeth of the arrangement illustrated in FIG. 11; and FIGS. 13 and 14 are views corresponding, respectively, to FIGS. 11 and 12 but showing a typical arrangement for producing a speed reduction ratio of 20 to 1.

Figure 8A:
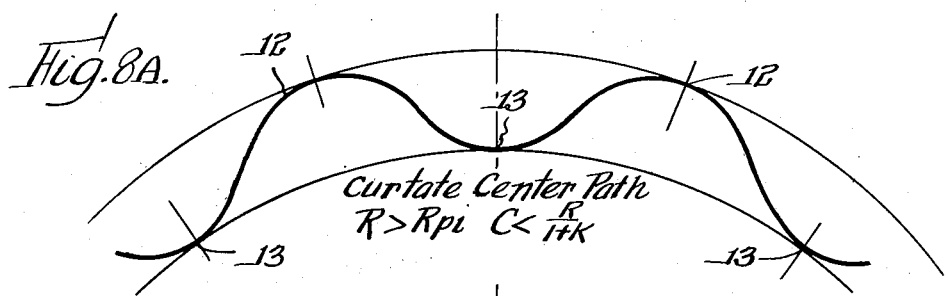
FIGS. 8A, 8B and 8C are curves illustrating three epitrochoids, curtate, cusped, and looped prolate, respectively, the latter being the epitrochoid utilized in this invention.

Referring first to FIGS. 1 and 2, one form of the differential gear reducer of this invention is generally designated at 49, it being a single stage differential gear reducer and providing a speed reduction ratio of 75 to 1. This differential gear reducer 49 may include an electric motor arranged within a housing 50 for rotating a shaft 51 at a desired selected speed, the shaft 51 being suitably journalled for rotation in a suitable bearing 52. The shaft 51 is concentric with and rotates about a central axis 1, and the housing 50 is provided with an annular supporting member 53 which is also concentric with the axis 1.

An eccentric 54 is secured to the shaft 51 as by a pressed fit, and the central axis for the eccentric 54 is designated at 2, the distance between the axes 1 and 2 setting forth the amount of eccentricity. The eccentric 54, accordingly, rotates with the shaft 51 for providing an eccentric oscillating motion. Preferably, the eccentric 54 also forms the inner race of a ball bearing having balls 55 and an outer race 56. The outer race 56 carries a rotor 57 having external teeth 58, these teeth having substantially circular engaging portions and being substantially circular in configuration. The teeth 58 on the rotor 57 mesh with internal teeth 59 on an annulus 60, the teeth 59 having substantially circular concave engaging portions. The annulus 60 is a stationary annulus which is secured in the support 53 as by a pressed fit, the annulus 60 thereby being concentric with the shaft axis 1. The internal toothed annulus is provided with 76 teeth, and the external toothed rotor is provided with 75 teeth so that in accordance with the formula $$K = \frac{N_e}{N_i - N_e} = \frac{75}{76 - 75}$$

a speed reduction ratio of 75 to 1 is provided. As the eccentric 54 is rotated by the shaft 51, the external toothed rotor 57 is oscillated thereby in mesh with the internal toothed annulus 60 and, due to the difference in the number of teeth, the external toothed rotor 57 is caused to rotate about itself once for each 75 rotations of the shaft 51. While a 75 to 1 speed reduction ratio is here set forth for purposes of illustration, other desired speed reduction ratios may be provided by the proper selection of the numbers of teeth.

To transmit the rotary motion of the external toothed rotor 57, the rotor may be provided with enlarged holes 61 which receive pins 69 formed on an output member 64 having an output shaft 65. The output member 64 is mounted for rotation about the shaft axis 1 and, in this respect, the output member 64 carries the inner race 66 of a ball bearing having balls 67 and an outer race 68, the outer race 68 being secured as by a pressed fit in the annular support 53. Thus, as the external toothed rotor 56 is oscillated by the eccentric 54 and is rotated upon itself, the rotation thereof is transmitted through the holes 61 in the rotor and the pins 69 on the output member 64 to rotate the output member about the central axis 1, the output member 64 being journalled for rotation by the ball bearing 66–68. A cap 70 is secured over the end of the support 53 for holding the assembly together and for maintaining the lubricant therein.

The rotor 57 and the annulus 60 may be molded from a suitable synthetic plastic material, such as nylon or the like or from a suitable powdered metal, such as powdered or sintered iron or the like by simple conventional plastic or powder metallurgy methods. The output member 64 may also be formed from any suitable material, such as synthetic plastic, powdered metal or the like.

The ball bearings which rotatably mount the rotor 57 on the eccentric 54 and the output member 64 in the support 53 decrease materially the friction losses at these points so as to provide a substantially free-running differential gear reducer assembly. Further, the teeth 58 and 59 on the rotor and annulus, respectively, in a manner to be pointed out hereafter, provide minimum pressure angles at the engaging teeth so as to minimize tooth loads and loads reflected back into the bearings. By reason of this bearing construction and tooth construction, extremely high efficiencies are obtained, efficiencies of over 90%. The teeth are also constructed so as to conjugate sufficiently during operation to provide smooth continuous continuity of angular motion with minimum noise and vibration.

Another form of the differential gear reducer of this invention is generally designated at 80 in FIGS. 3 and 4, this form of the invention differing from that of FIGS. 1 and 2 by providing a dual stage operation. Here the same electric motor, housing 50, shaft 51, shaft bearing 52 and annular support 53 may be provided with the shaft rotating about the central axis 1. An eccentric 81 is secured to the shaft 51 as by a pressed fit, the axis of the eccentric being designated at 2. The eccentric 81 provides the inner race of a ball bearing having two rows of balls 82 and an outer race 83 upon which is secured, as by a pressed fit, a rotor 84 having two rings of external teeth 85 and 86. The ring of external teeth 85 meshes with internal teeth 87 on an annulus 88 which is stationarily secured in the annular support 53. The ring of external teeth 86 meshes with internal teeth 89 on an output member 90 which is journalled for rotation about the axis 1 by a ball bearing including an inner race 92 secured to the output member 90, balls 93 and an outer race 94 secured to the annular support 53. The output member 90 is provided with an output shaft 91. The parts are maintained in assembled relation, and a lubricant is maintained in the assembly by cap 95 suitably secured to the annular support 53.

As the eccentric 81 is rotated by the shaft 51, the rotor 84 is oscillated and the rotation of this rotor about itself is controlled by the relative numbers of external teeth 85 on the rotor 84 and the internal teeth 87 on the stationary annulus 88. If the numbers of teeth are equal, no rotation is imparted to the rotor 84. If the numbers of teeth are different, rotation will be imparted to the rotor 84, in accordance with the aforementioned formula for computing the speed reduction ratio. Relative rotation between the oscillating rotor 84 and the output member 90 is determined by the relative numbers of teeth thereon. Here, also, if the numbers of teeth are the same no relative rotation is imparted but, if the numbers of teeth are different, then relative rotation is imparted in accordance with the aforementioned formula. Thus, the speed of rotation of the output member 90 is dependent upon the coaction between the first set of teeth 85, 87 and the second set of teeth 86, 89.

In this form of the invention, ball bearings are also utilized to reduce friction and the various teeth of the rotor and annuli are constructed to provide minimum pressure angles at contact and proper conjugation of teeth for producing highly efficient and substantially noiseless and vibrationless operation.

In the construction of the cooperating teeth of the rotor and the annulus to provide high efficiency and proper conjugation, various interdependent factors must be taken into consideration. These factors are different for different speed reduction ratios (hereafter called K), power capacity, size of teeth, diameters of rotor and annulus, and amount of eccentric motion (hereafter called C). These affect tooth form and also dynamic balance characteristics and, in this regard, if the internal tooth form of the annulus is determined, it mathematically fixes the form the rotor external tooth must take in order to insure uniform angular movement. In the description that follows, a perfectly circular tooth form in the annulus is used since experiment has proven that it is possible to obtain extremely high efficiencies with this tooth form. Hereafter, the radius from the central axis 1 to the center of these circular teeth of the annulus will be represented by the character R. There are thus established the basic factors K, C, and R and, in accordance with this invention, they are combined in their optimum values with the most effective tooth form to produce a differential gear reducer of maximum efficiency.

Figure 8B:
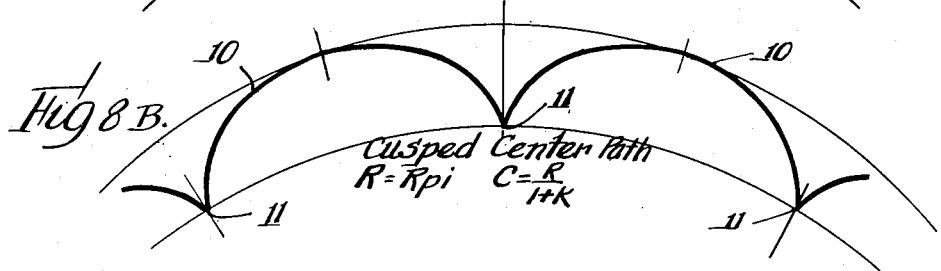
Figure 8C:
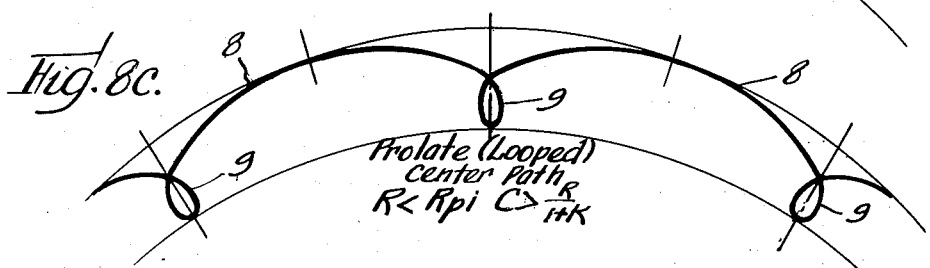

In the description that follows, three mathematical curves will be considered, these curves being from the general family of curves known as epitrochoids. These curves are traced by the tooth centers of the annulus upon the rotor when the two are rotated in a timed relation, in accordance with the speed reduction ratio K, and about the eccentric axes 1 and 2, which are arranged apart at a distance C. For the sake of simplicity, these curves are termed center paths, and the tooth center of the annulus is termed the trace point. The three curves are illustrated in FIGS. 8A, 8B and 8C, and they result from varying values of C and R. The curtate center path curve of FIG. 8A results when R is greater than the radius to the pitch point of the internal toothed annulus and when C is less than $$\frac{R}{1+K}$$

The cusped center path curve of FIG. 8B results when R is equal to the radius to the pitch point of the internal toothed annulus and when C is equal to $$\frac{R}{1+K}$$

The looped prolate center path curve of FIG. 8C results when R is less than the radius to the pitch point of the internal toothed annulus and when C is greater than $$\frac{R}{1+K}$$

The curtate form of FIG. 8A is generally known in the art and no detailed consideration thereof is given here, except to say that it is suited only to large values of C and low values of K and is extremely inefficient in operation because of large pressure angles existing at the points of contact of the teeth. The cusped form of FIG. 8B will be considered for comparison purposes only, since teeth generated from this form are structurally unsound, do not have small pressure angles, do not yield uniform angular motion, and are noisy in operation. In accordance with the instant invention, the looped prolate form of FIG. 8C is used, and it is admirably suited to small values of C and high K ratios. Its use is also most appropriate when it is desired for manufacturing reasons to have C as large as possible. In this connection, a 75 to 1 K ratio would require C of .009" using the curtate form, while using the looped prolate form a C of .018" is obtainable. As a result, wear and tolerance problems are greatly minimized.

Regardless of how the gears are to be used in a speed reducing (or increasing) system, whether they roll on fixed centers or whether one of them is carried around by an eccentric, their relative motion is still that of the system shown in FIG. 5. Here, two systems of coordinates are used. The X—Y coordinates are stationary, the origin being at the center 1 of the internal toothed annulus. The x—y coordinates have their origin at the center of the external toothed rotor, the fixed point corresponding to $X=0$, $Y=C$ and they are attached to rotate with the external toothed rotor. The tracing point 6, which is the center of the circular internal tooth of the annulus, is at a distance R from the center of the internal toothed annulus and is, of course, fixed to the annulus. As the annulus rotates, the tracing point 6 follows the circle 7 which is concentric with the axis 1. When the annulus rotates about its axis 1 through an arbitrary angle $\epsilon$, the rotor must turn about its axis through an angle $$\frac{N_i}{N_e}\epsilon$$

where $N_i$ is the number of internal teeth in the annulus and $N_e$ is the number of external teeth in the rotor, because the fundamental requirement of the gearing of this invention is that they have a constant angular velocity ratio determined by the ratio of the numbers of teeth. The relative motion is the same as that of two non-slipping circles 3 and 4 rolling on the centers 1 and 2 and having pitch radii proportional to the numbers of teeth in the annulus and rotor. The pitch radius for the circle 3 of the internal toothed annulus is designated $R_{pi}$ and the pitch radius for the circle 4 of the external toothed rotor is designated $R_{pe}$. The ratios of the pitch radii and the numbers of teeth are $$\frac{R_{pi}}{R_{pe}}=\frac{N_i}{N_e}$$

The pitch circles 3 and 4 contact one another at the pitch point 5 on the Y axis of the X—Y coordinates. Generally, if C, $N_i$, and $N_e$ are assumed, the pitch radii are determined from the following formulas:

$$R_{pe}=\frac{CN_e}{N_i-N_e}$$

$$R_{pi}=\frac{CN_i}{N_i-N_e}$$

In particular, if the gearing is to be of the single stage reducer type, where the rotor is eccentrically driven and the output is picked off in a one-to-one ratio by some means from the rotor, such as in FIGS. 1 and 2, the system has a speed reduction ratio K given by the aforementioned formula $$K=\frac{N_e}{N_i-N_e}$$

Thus, it is convenient to express the pitch radii in terms of K and C, $R_{pe}=CK$ and $R_{pi}=C(K+1)$.

Referring again to FIG. 5, it is assumed that the tracing point 6 is initially at the Y-axis corresponding to $\epsilon=0$. Obviously, this defines the point at which the generated curve comes closest to the rotor center. If now the tracing point is moved along the circle 7 through an arbitrary angle $\epsilon$ and the x—y coordinate system is simultaneously moved through the angle $$\frac{N_i}{N_e}\epsilon$$

a new point 6-1 is defined in the x—y system. The coordinates of this point are given by the following parametric equations:

$$x=-R\sin\left(\frac{\epsilon}{K}\right)+C\sin\left(\epsilon+\frac{\epsilon}{K}\right)$$
$$y=R\cos\left(\frac{\epsilon}{K}\right)-C\cos\left(\epsilon+\frac{\epsilon}{K}\right) \tag{1}$$

If R is given and C is assumed, these equations give a value of x and y corresponding to every choice of a value for the arbitrary variable parameter $\epsilon$. If the parameter is varied in increments, the corresponding values of x and y can be plotted to any convenient scale, determining a series of points 6 which all lie on the center path sought. One full cycle of the path is determined if $\epsilon$ varies from 0° to 360°.

Different paths result from choosing different values for the center distance C, these curves being classified as curtate in FIG. 8A when C is less than $$\frac{R}{1+K}$$

as cusped in FIG. 8B when C is equal to $$\frac{R}{K+1}$$

and looped prolate in FIG. 8C when C is greater than $$\frac{R}{K+1}$$

Since, in any design, R and K are predetermined and must be held fixed, and since for the generally large reduction ratios desired it is preferable to use as large a center distance C as possible, the looped prolate center path is the most desirable. FIGS. 5 and 6 show graphically how such a looped prolate path is generated and in these figures the values used for purposes of illustration are $R=3$, $K=4$, and $C=1$. In FIG. 5 the particular position for which the rotating x—y coordinate system is shown corresponds to the value of the parameter $\epsilon=40°$. Checking this by means of the aforementioned parametric Equations 1, we have $$\epsilon=40°\frac{\epsilon}{K}=10°\epsilon+\frac{\epsilon}{K}=50°$$

The equations give $$x=-.52095+.76604=.245$$
$$y=2.95443-.64279=2.312$$

FIG. 6 illustrates the manner of generating the looped prolate center path, the generation being accomplished, for purposes of illustration, at $\epsilon$ angles of 30° from 0° to 360°, the respective center path points so generated being designated from 6 to 6-12 along the circle 7 having the radius R. A complete prolate path for 360° rotation of the tracing point 6 is shown at 8 in the upper right hand portion of FIG. 6. The ends of the prolate path 8 form loops 9. A complete prolate path with respect to the external toothed rotor is one revolution thereof, as shown in FIG. 7, there being four such prolate paths 8 since the speed reduction ratio K was assumed to be 4. Each prolate path 8 with its loops 9 extends through $$\frac{360°}{K}$$

there being thus K number of looped prolate paths in a complete cycle of rotation of the external toothed rotor. The beginning of each path is at $\epsilon=0$, and the end of each path is at $\epsilon=360°$ while the midpoint of the path is at $\epsilon=180°$. One point of particular importance on the looped prolate curve is the point at which the curve is tangent to a radial line. This is the point designated in FIG. 7 as $\epsilon=\epsilon_0$ where the curve has a zero pressure angle, and this point must be on the active part of the center path of the tooth profile in order to provide maximum efficiency. The curtate center path curve 12 of FIG. 8A has an undulating $\epsilon=0$ point 13 and there can be no point thereon corresponding to the point $\epsilon=\epsilon_0$ as in FIG. 7. There, therefore, can not be any zero pressure point in the curtate center path system. The cusped center path curve 10 of FIG. 8B has a sharp point 11 corresponding to the point $\epsilon=0$ in FIG. 7 and it is only at this point where $\epsilon$ can equal $\epsilon_0$. Here, however, this point of zero pressure angle, since it occurs at point 11 in FIG. 8B, cannot be present on an active face of the gear teeth. Accordingly, only in the looped prolate center path system can a zero pressure angle be obtained on an active face of the gearing.

Figure 9:
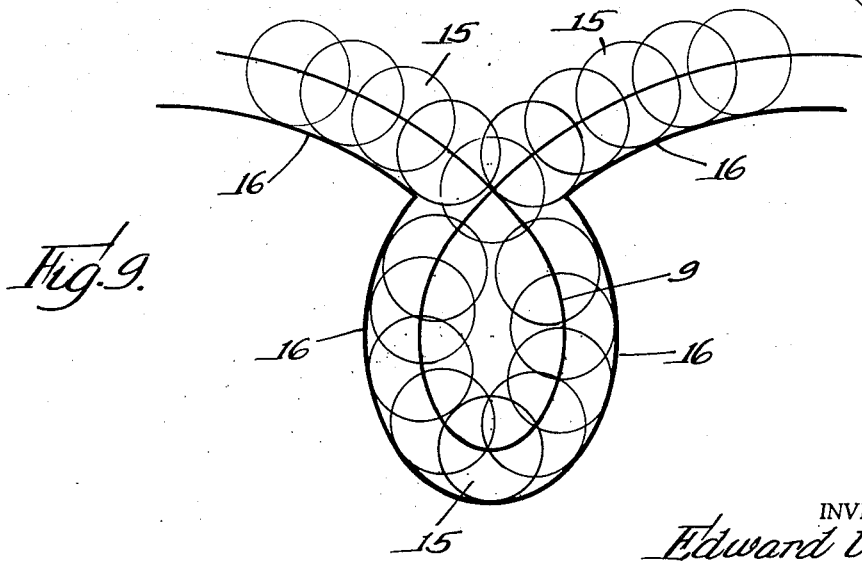
FIG. 9 is a portion of the looped prolate center path showing the teeth of the annulus following that center path, and showing the envelope curve of such teeth.

After computing the looped prolate center path, as described above, the actual tooth curves can be determined by layout, by scribing a series of circles 15 equal to the diameters of the internal teeth of the annulus with centers of the circles at various points along the center path, and drawing a curve 16 which is the envelope of these circles, as illustrated in FIG. 9. The portion of the envelope curve 16 in the loop 9 of the looped prolate curve 8 is the critical portion of the gear system, it forming the contact area and including the minimum pressure angles. This envelope curve 16 in this area forms the basis for the construction of the external teeth on the rotor, and the relationships there involved are illustrated in greater detail in FIG. 10.

In the design of gear teeth of this type, a number of general considerations must be kept in mind. The teeth must have sufficient carry-over of conjugate contact between adjacent teeth, so that there are no gaps or shocks in the uniform transmittal of motion. In the case of the gearing under consideration, this means that somewhere on the tooth profiles a smooth section must exist over which the parameter $\epsilon$ varies through an angle greater than $$\frac{360°}{N_1}$$

Also, the pressure angles at the active points of contact of the gear teeth should be as small as possible to minimize tooth and bearing loads. In addition, at no point should the external tooth form of the rotor interfere with the internal tooth of the annulus. It is better if clearance exists between the tooth forms at every point except where there is advantageous transmittal of motion. Further, the teeth of the rotor should have sufficient structural strength to carry the loads required. Also, the design should be such that dimensional variations due to manufacturing tolerances and wear have a minimum effect on the smoothness of action. Further, for ease of manufacturing, it should be possible to closely approximate the external tooth form of the rotor with an arc of a circle.

To aid in determining the best tooth forms in accordance with these criteria, formulas have been derived and are set forth hereafter for various features of the center paths. These formulas are all related to the parametric Equations 1 set forth above. Every point 6 of the center path corresponds to a particular value of the parameter $\epsilon$, and vice versa. Thus, the meaning of an $\epsilon$ point of the center path should be clear, that is, for example, a 30° point is the one given by the setting $\epsilon=30°$ and solving for $x$ and $y$. It is simplest to describe certain features of the center paths, such as radius of curvature, pressure angles and so forth, by formulas in terms of the parameter $\epsilon$.

Typical $\epsilon$-points of a looped prolate center path are shown in FIGS. 6 and 7. As expressed above, one point of particular importance is the point $\epsilon=\epsilon_0$ in FIG. 7 at which the curve is tangent to a radial line. This is the point where the curve has zero pressure angle and, according to the above discussed general considerations, this point must be on the active part of the center path of the tooth profile. A formula will be given hereafter for the value of the parameter $\epsilon$ which corresponds to this point, and it has been given the special symbol $\epsilon_0$.

As an aid in computation, and for the purpose of observing basic similarities in many different designs, it is best to write the equations as much as possible in a dimensionless form. Toward this end, a center distance magnification factor $m$ is defined as follows:

$$m = \frac{C(K+1)}{R}$$

or, equivalently, (2)

$$C = m\left(\frac{R}{K+1}\right)$$

The magnification factor is a dimensionless quantity which enables the classification of the various center paths as undulating curtate in FIG. 8A when $m$ is less than 1, cusped in FIG. 8B when $m$ is equal to 1, and looped prolate in FIG. 8C when $m$ is greater than 1. With this in mind, the parametric Equations 1 above of the center path may be written in terms of the center distance magnification factor $m$ as follows:

$$\begin{aligned} x &= R\left[-\sin\left(\frac{\epsilon}{K}\right) + \left(\frac{m}{K+1}\right)\sin\left(\epsilon + \frac{\epsilon}{K}\right)\right] \\ y &= R\left[\cos\left(\frac{\epsilon}{K}\right) - \left(\frac{m}{K+1}\right)\cos\left(\epsilon + \frac{\epsilon}{K}\right)\right] \end{aligned} \quad (3)$$

These equations are in every way equivalent to the parametric Equations 1 above. Let $r$ equal the radius to any $\epsilon$-point of the center path, then $$r = \sqrt{x^2 + y^2} = R\sqrt{1 + \left(\frac{m}{K+1}\right)^2 - 2\left(\frac{m}{K+1}\right)\cos\epsilon} \quad (4)$$

Let $\rho$ equal the radius of curvature of the center path, then $$\rho = R\left[\sqrt{\frac{1 + m^2 - 2m\cos\epsilon}{1 + \frac{Km(m-\cos\epsilon)}{1+m^2-2m\cos\epsilon}}}\right] \quad (5)$$

The particular value of $\epsilon$ for which the looped center path is tangent to a radial line is given by $$\cos\epsilon_0 = \frac{K+1+m^2}{m(K+2)} \quad (6)$$

Values of the various quantities determined for $\epsilon=\epsilon_0$ will carry the same subject, that is, $x_0$, $y_0$, and so forth.

Formulas 2 through 6 are all in dimensionless form, except for the factor R. These formulas apply to all possible center paths, as shown in FIGS. 8A, 8B and 8C, but it should be noted that in Equation 6 $m$ must be greater than (or equal to) 1 and less than (or equal to) $K+1$, since the value of a cosine cannot be greater than 1. This means that the curtate center path cannot have a zero pressure angle point and that only the looped prolate and cusped center paths can have a zero pressure angle point. For the cusped path where $m=1$, the zero pressure angle is that $\epsilon=0$, and Equation 5 shows that at this point the radius of curvature of the cusped path is zero.

Accordingly, in the vicinity of this point the curve is concave toward the center and has a very small radius of curvature as well as rapidly increasing pressure angle. Hence, the cusped curve is not a good center path for this type of gearing. As a result, to obtain proper tooth formation in accordance with this invention, $m$ must be greater than 1 and less than $K+1$, which requires the base curve for the teeth formation to be a looped prolate center path curve. By reason of the foregoing analysis, FIG. 10 illustrates how a tooth form is derived for the rotor for use in the differential gear reducer of this invention. This tooth form has been found to be highly efficient, quiet and vibrationless.

Referring further to FIG. 10, the circles 15 represent four internal teeth of the annulus 60, one of the teeth 15 being located at a distance from the rotor on the curve 8 so as to illustrate the manner in which clearance between the annulus and rotor is obtained, and the other three teeth being designated A, B and C, which are arranged in the critical contacting area. In FIG. 10 the internal annulus teeth A and B are in pressure contact with the external rotor tooth 17, while the internal annulus tooth 15 has left the rotor tooth 17. In other words, A represents the position of a tooth just entering engagement with the rotor, B represents the second tooth back, and C the third tooth back. By use of the looped prolate center path, it is thus evident that by choosing eccentric distance C as required, one, two or three teeth 15 may be in simultaneous engagement with the rotor 17. This choice is impossible with the cusped type center path and is severely limited, if not impossible, with the curtate type center path. By having two or more teeth in engagement, the power that can be transmitted through the reducer is greatly strengthened, and noise and vibration are substantially eliminated. The engaging surface 18 of the external rotor teeth 17 is circularly concave for ease of manufacturing, and the active portions thereof correspond to the loop portion 9 of the looped prolate center path 8 adjacent the zero pressure angle, the zero pressure angle being $\rho_0$ and being at a distance $r_0$ from the axis 2 of the rotor. To provide adequate and proper power transmission, the external teeth 17 of the rotor must be sufficiently thick, as shown by the dimension $t$, this dimension being a function of the numbers of teeth and the radii of the annulus and rotor. The spacing of the teeth in the rotor corresponds to $$\frac{360°}{N_e}$$

Having thus described the manner of forming the configuration of the external teeth on the rotor with respect to the internal teeth on the annulus following the use of the looped prolate center path base, in accordance with this invention, a specific typical example thereof is illustrated in FIGS. 11 and 12, these being the teeth utilized in the form of the invention illustrated in FIGS. 1 and 2. Here, a 75 to 1 speed reduction ratio is provided, there being 76 internal circular teeth on the annulus and 75 external teeth on the rotor. The radius from the axis 1 to the tracing point or center of the annulus teeth is 1.000", and the external radius of the rotor is .985". The internal teeth 59 of the annulus 60 are circular in configuration, as shown by the circles 15, and the annulus 60 is cut back, as indicated at 19, for providing clearance for the rotor teeth 17. The annulus teeth have a diameter of .060". The rotor teeth 17 have circular concave engaging faces 18 of a radius of .038", these radii being struck from points on a radius of .986" from the eccentric axis 2 and at distances of .006" from the midpoints between the teeth.

A differential gear reducer constructed in accordance with the form of the invention illustrated in FIGS. 1 and 2 and having the annulus, rotor and tooth dimensions set forth in FIGS. 11 and 12 and having an eccentric value C of .020" produces efficiency well above 90% with substantially no noise or vibration, these extremely beneficial results being brought about by basing the teeth on the looped prolate center path in accordance with this invention.

FIGS. 13 and 14, which are similar to FIGS. 11 and 12, set forth the dimensions for a differential gear reducer having a speed reduction ratio of 20 to 1 wherein the annulus has 21 internal teeth 15 and the rotor has 20 external teeth 17, and wherein the eccentricity value C is 143". Outside of specific differences in actual dimensions, the arrangement of FIGS. 13 and 14 is like that of FIGS. 11 and 12, and a further description is not considered necessary, with one exception. In FIGS. 13 and 14 two radii of curvature are used for the concave faces 18 of the teeth 17, these curvatures of the faces 18 blending together. In the arrangement of FIGS. 13 and 14 high efficiencies of over 90% have also been obtained.

While for purposes of illustration several forms of this invention have been disclosed, other forms thereof may become apparent to those skilled in the art upon reference to this disclosure and, therefore, this invention should be limited only by the scope of the appended claims.

I claim as my invention:

1. A differential gear reducer comprising an internal toothed annulus and an external toothed rotor arranged eccentrically with respect to the annulus and meshing therewith, wherein the teeth of the rotor are based on a looped prolate center path generated by a tracing point on the tooth centers of the annulus with respect to the rotor upon rotation of the annulus and rotor in accordance with the speed reduction ratio.

2. A differential gear reducer comprising an internal toothed annulus and an external toothed rotor arranged eccentrically with respect to the annulus and meshing therewith, wherein the teeth of the rotor are based on a looped prolate center path generated by a tracing point on the tooth centers of the annulus with respect to the rotor upon rotation of the annulus and rotor in accordance with the speed reduction ratio, and wherein the active engaging portions of the teeth are near the zero pressure angle.

3. A differential gear reducer comprising an internal toothed annulus and an external toothed rotor arranged eccentrically with respect to the annulus and meshing therewith, wherein the teeth of the rotor are based on a looped prolate center path generated by a tracing point on the tooth centers of the annulus with respect to the rotor upon rotation of the annulus and rotor in accordance with the speed reduction ratio, and wherein at least two teeth engage simultaneously.

4. A differential gear reducer comprising an internal toothed annulus and an external toothed rotor arranged eccentrically with respect to the annulus and meshing therewith, wherein the teeth of the rotor are based on a looped prolate center path generated by a tracing point on the tooth centers of the annulus with respect to the rotor upon rotation of the annulus and rotor in accordance with the speed reduction ratio, and wherein the active engaging portions of the teeth are near the zero pressure angle, and wherein at least two teeth engage simultaneously.

5. A differential gear reducer comprising an internal toothed annulus and an external toothed rotor arranged eccentrically with respect to the annulus and meshing therewith, wherein $$R < R_{pl}$$

and $$C > \frac{R}{1+K}$$

where R is the radius to the tracing point on the tooth centers of the annulus with respect to the rotor, $R_{pl}$ is the radius to the pitch point of the annulus, C is the eccentricity of the rotor with respect to the annulus and K is the speed reduction ratio, and wherein the teeth of the rotor are based on a looped prolate center path generated by the tracing point upon rotation of the annulus and rotor in accordance with the speed reduction ratio.

6. A differential gear reducer comprising an internal toothed annulus and an external toothed rotor arranged eccentrically with respect to the annulus and meshing therewith, wherein $$R_{pe} = CK$$

and $$R_{pi} = C(K+1)$$

where $R_{pe}$ is the radius to the pitch point of the rotor, $R_{pi}$ is the radius to the pitch point of the annulus, C is the eccentricity of the rotor with respect to the annulus and K is the speed reduction ratio, wherein $$R < R_{pi}$$

and $$C > \frac{R}{1+K}$$

where R is the radius to the tracing point on the tooth centers of the annulus with respect to the rotor, and wherein the teeth of the rotor are based on a looped prolate center path generated by the tracing point upon rotation of the annulus and rotor in accordance with the speed reduction ratio.

7. A differential gear reducer comprising an internal toothed annulus and an external toothed rotor arranged eccentrically with respect to the annulus and meshing therewith, wherein $$R < R_{pi}$$

and $$C > \frac{R}{1+K}$$

where R is the radius to the tracing point on the tooth centers of the annulus with respect to the rotor, $R_{pi}$ is the radius to the pitch point of the annulus, C is the eccentricity of the rotor with respect to the annulus and K is the speed reduction ratio, wherein the teeth of the rotor are based on a looped prolate center path generated by the tracing point upon rotation of the annulus and rotor in accordance with the speed reduction ratio, and wherein the active engaging portions of the teeth are near the zero pressure angle where $$\cos \epsilon_0 = \frac{K+1+m^2}{m(K+2)}$$

in the equation $$\rho = R \left[ \frac{\sqrt{1+m^2-2m \cos \epsilon}}{1+\frac{Km(m_2-\cos \epsilon)}{1+m^2-2m \cos \epsilon}} \right]$$

where $\rho$ is the radius of curvature of the looped prolate center path, $\epsilon$ is the angular position of the tracing point, and $m$ is the center distance magnification factor $$m = \frac{C(K+1)}{R}$$

and is greater than 1 and less than $K+1$.

8. A differential gear reducer comprising an internal toothed annulus and an external toothed rotor arranged eccentrically with respect to the annulus and meshing therewith, wherein $$R_{pe} = CK$$

and $$R_{pi} = C(K+1)$$

where $R_{pe}$ is the radius to the pitch point of the rotor, $R_{pi}$ is the radius to the pitch point of the annulus, C is the eccentricity of the rotor with respect to the annulus and K is the speed reduction ratio, wherein $$R < R_{pi}$$

and $$C > \frac{R}{1+K}$$

where R is the radius to the tracing point on the tooth centers of the annulus with respect to the rotor, wherein the teeth of the rotor are based on a looped prolate center path generated by the tracing point upon rotation of the annulus and rotor in accordance with the speed reduction ratio, and wherein the active engaging portions of the teeth are near the zero pressure angle where $$\cos \epsilon_0 = \frac{K+1+m^2}{m(K+2)}$$

in the equation $$\rho = R \left[ \frac{\sqrt{1+m^2-2m \cos \epsilon}}{1+\frac{Km(m-\cos \epsilon)}{1+m^2-2m \cos \epsilon}} \right]$$

where $\rho$ is the radius of curvature of the looped prolate center path, $\epsilon$ is the angular position of the tracing point, and $m$ is the center distance magnification factor $$m = \frac{C(K+1)}{R}$$

and is greater than 1 and less than $K+1$.

9. A differential gear reducer comprising a rotatable shaft having an eccentric thereon, an external toothed rotor rotatably mounted on the eccentric, and an internal toothed annulus concentric with the shaft and meshing with the rotor for providing a desired speed reduction ratio, wherein the teeth of the rotor are based on a looped prolate center path generated by a tracing point on the tooth centers of the annulus with respect to the rotor upon rotation of the annulus and rotor in accordance with the speed reduction ratio.

10. A differential gear reducer comprising a rotatable shaft having an eccentric thereon, an external toothed rotor freely rotatably mounted on the eccentric, and a stationary internal toothed annulus concentric with the shaft and meshing with the rotor to rotate the latter in accordance with a desired speed reduction ratio, wherein the teeth of the rotor are based on a looped prolate center path generated by a tracing point on the tooth centers of the annulus with respect to the rotor upon rotation of the annulus and rotor in accordance with the speed reduction ratio.

11. A differential gear reducer comprising a rotatable shaft having an eccentric thereon, an external toothed rotor rotatably mounted on the eccentric and having its rotation controlled, and an internal toothed annulus rotatably mounted concentrically with the shaft and meshing with the rotor and rotated thereby in accordance with a desired speed reduction ratio, wherein the teeth of the rotor are based on a looped prolate center path generated by a tracing point on the tooth centers of the annulus with respect to the rotor upon rotation of the annulus and rotor in accordance with the speed reduction ratio.

12. A multiple differential gear reducer comprising a rotatable shaft having an eccentric thereon, a rotor rotatably mounted on the eccentric and having two rings of external teeth, a stationary internal toothed annulus concentric with the shaft and meshing with one ring of teeth on the rotor to rotate the latter with a desired speed reduction ratio, and a rotatable internal toothed annulus rotatably mounted concentrically with the shaft and meshing with the other ring of teeth on the rotor and rotated thereby with a desired speed reduction ratio, wherein the teeth of the rotor are based on looped prolate center paths generated by tracing points on the tooth centers of the annuli with respect to the rotor upon rotation of the annuli and rotor in accordance with the speed reduction ratios.

13. A differential gear reducer comprising an internal toothed annulus and an external toothed rotor arranged eccentrically with respect to the annulus and meshing therewith, wherein the internal teeth of the annulus have substantially circular convex engaging portions, wherein the external teeth of the rotor have substantially circular concave engaging portions, and wherein the teeth of the rotor are based on a looped prolate center path generated by a tracing point on the tooth centers of the annulus with respect to the rotor upon rotation of the annulus and rotor in accordance with the speed reduction ratio.

14. A differential gear reducer comprising a rotatable shaft having an eccentric thereon, an external toothed rotor, a ball bearing rotatably mounting the rotor on the eccentric, and an internal toothed annulus concentric with the shaft and meshing with the rotor for providing a desired speed reduction ratio, wherein the teeth of the rotor are based on a looped prolate center path generated by a tracing point on the tooth centers of the annulus with respect to the rotor upon rotation of the annulus and rotor in accordance with the speed reduction ratio.

15. A differential gear reducer comprising a rotatable shaft having an eccentric thereon, an external toothed rotor, a ball bearing rotatably mounting the rotor on the eccentric, and an internal toothed annulus concentric with the shaft and meshing with the rotor for providing a desired speed reduction ratio, wherein the internal teeth of the annulus have substantially circular convex engaging portions, wherein the external teeth of the rotor have substantially circular concave engaging portions, and wherein the teeth of the rotor are based on a looped prolate center path generated by a tracing point on the tooth centers of the annulus with respect to the rotor upon rotation of the annulus and rotor in accordance with the speed reduction ratio.

References Cited in the file of this patent

UNITED STATES PATENTS

| | | |
|---|---|---|
| Re. 10,381 | Vivarttas | Sept. 11, 1883 |
| 1,694,031 | Braren | Dec. 4, 1928 |
| 1,817,405 | Braren | Aug. 4, 1931 |
| 2,303,365 | Karlsen | Dec. 1, 1942 |
| 2,666,336 | Hill et al. | Jan. 19, 1954 |

OTHER REFERENCES

"Kinematics of Gerotors, Rotoids and Gears," by Myron F. Hill, 1947.